United States Patent [19]

Mason et al.

[11] 4,119,990
[45] Oct. 10, 1978

[54] FLUID APPLICATOR DOCTOR BLADE

[75] Inventors: Paul B. Mason, Magnolia; Martin S. Osman, Newton Highlands, both of Mass.

[73] Assignee: Polaroid Corporation, Cambridge, Mass.

[21] Appl. No.: 811,716

[22] Filed: Jun. 30, 1977

[51] Int. Cl.² ............................................. G03C 11/00
[52] U.S. Cl. ..................................... 354/317; 354/88; 352/78 R; 352/130; 118/415
[58] Field of Search .................... 354/88, 317; 352/78, 352/130, 72; 118/410, 411, 412, 413, 415

[56] References Cited

U.S. PATENT DOCUMENTS

| 3,407,786 | 10/1968 | Beyer et al. | 118/411 |
| 3,871,013 | 3/1975 | Burke et al. | 354/317 |
| 3,887,272 | 6/1975 | Weed | 352/130 |
| 3,951,530 | 4/1976 | Czumak et al. | 352/72 |

Primary Examiner—L. T. Hix
Assistant Examiner—Alan Mathews
Attorney, Agent, or Firm—Frederick A. Goettel, Jr.

[57] ABSTRACT

A doctoring surface conformation for applicator nozzle structures in photographic film cassette contained processors by which a coating of processing fluid may be deposited on a moving run of an exposed film strip. The doctoring surface conformation is configured to present a plurality of relatively small entrance channels at the upstream or entrance end thereof and a single exit channel at the downstream or exit end thereof. In the preferred embodiment, the doctoring surface conformation is defined by a plurality of first inclined surfaces extending from the vicinity of the trailing edge of the fluid applicator nozzle and converging in the direction of film strip movement towards the surface of the film. A plurality of second inclined surfaces extending also from the vicinity of the trailing edge of the nozzle opening in close proximity to the film surface and diverging in the direction of film strip movement away from the film surface are provided in alternating, side-by-side relation with the first plurality of inclined surfaces. The arrangement of the two series of inclined surfaces cooperate to present a comb-like arrangement at the leading end of the doctoring surface as viewed from upstream of the doctoring surface in the direction of film strip movement. The doctoring surface conformation is configured so as to produce a positive hydrodynamic force in processing fluid passing under the doctoring surface.

22 Claims, 7 Drawing Figures

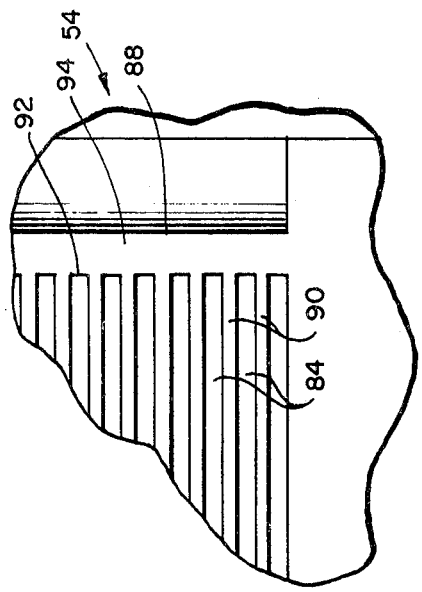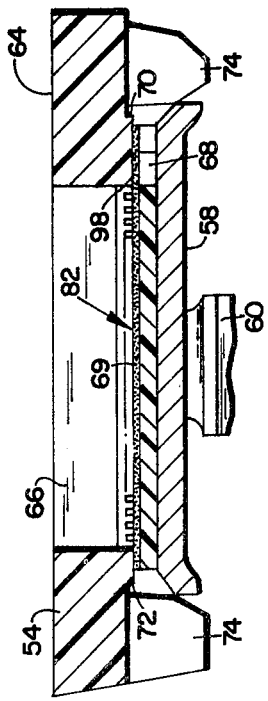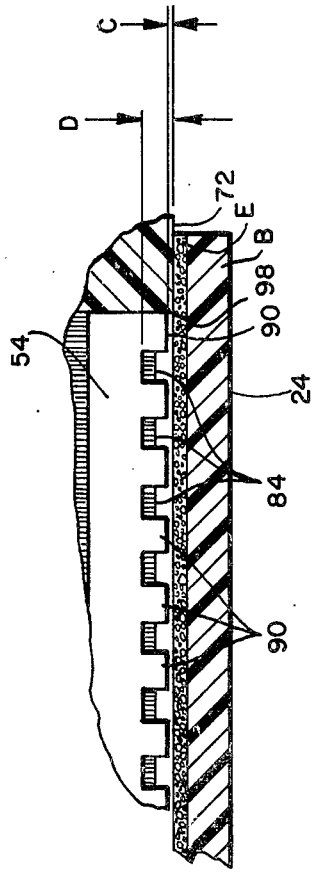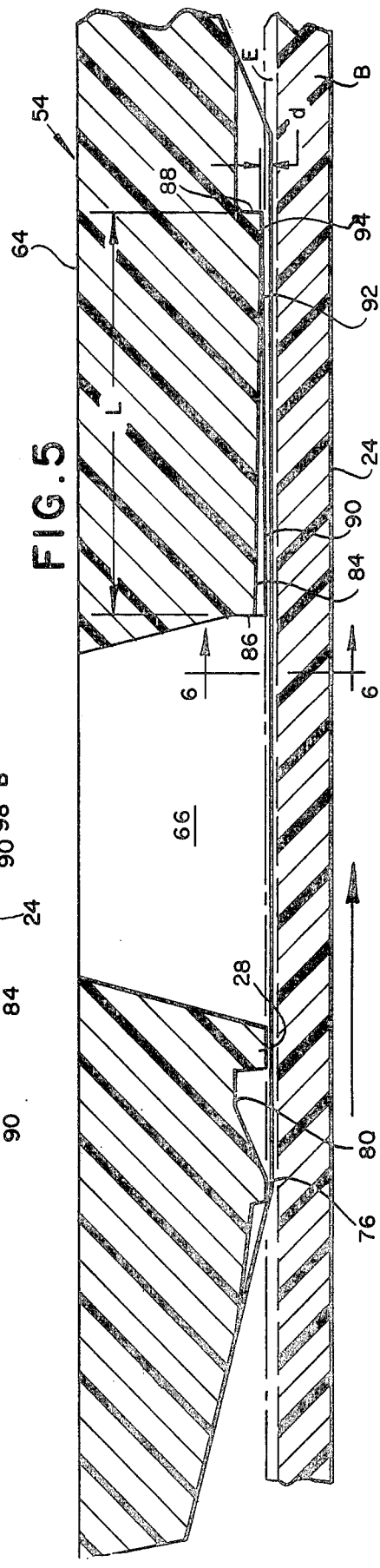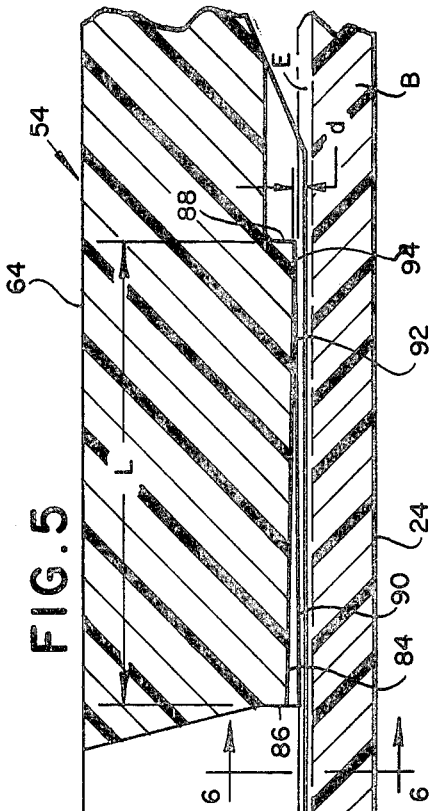

FLUID APPLICATOR DOCTOR BLADE

BACKGROUND OF THE INVENTION

This invention relates to photographic film processing apparatus and, more particularly, it concerns an improved doctoring surface for use in an applicator nozzle structure for depositing a uniform layer of processing fluid on a moving run of cassette contained photographic film.

Motion picture systems in which exposure, processing and projection operations are carried out on a film strip contained at all times in a multipurpose cassette are disclosed in several issued U.S. patents, assigned in common with the present invention. In these systems, the strip of film, as supplied with the cassette, is initially wound on a supply spool and advanced to a takeup spool when the cassette is placed in an appropriate camera for exposure in essentially conventional fashion. Following exposure, the cassette is placed into a viewing apparatus capable of activating a cassette contained processor to deposit a uniform layer or coating of processing fluid along the length of the film strip as it is rewound from the takeup spool back to the supply spool. Thereafter, a series of successive transparent image frames formed on the film strip may be viewed by projection and rewound for subsequent projection cycles as desired.

The achievement of a uniform layer or coating of processing fluid on the film strip during the processing operation is vital to overall system operation and has been a major focal point of attention in overall system development. The current state of the art with respect to achieving a uniform coating of processing fluid on such cassette contained film strips is represented by the disclosures of U.S. Pat. Nos. 3,871,013 issued Mar. 11, 1975 to Edward F. Burke and Douglas B. Holmes, and 3,951,530 issued Apr. 20, 1976 to Frank M. Czumak, Paul B. Mason and Joseph A. Stella, both of which patents are commonly assigned with the present invention. In the disclosures of these patents, an inclined doctoring surface is used to develop a positive hydrodynamic force in the deposited processing fluid to thereby hold the film in engagement with an underlying pressure pad; the latter being operative to support the film strip beneath the doctoring surface in a manner to provide a net balance of forces on opposite sides of the film strip. Another configuration for achieving uniform processing fluid deposition is illustrated and described in copending U.S. patent application Ser. No. 791,025, filed Apr. 26, 1977 by F. M. Czumak and P. B. Mason, entitled "Film Cassette Contained Processing Fluid Applicator Having Converging Fluid Channel", which patent application is also commonly assigned with the present invention.

Because of the need for cassette ventilation, both to dry the processing fluid and to cool the film strip during projection, and also because of the environment to which the cassette may be exposed in normal use, it is difficult, if not impossible to prevent entry of foreign particles and/or dust to the cassette material. While the presence of such particles is not a serious problem to film strip exposure and projection, it is critical to proper film strip processing that foreign particles present on the film strip be prevented from accumulating in the region of the doctoring surface by which the processing fluid is spread uniformly onto the film strip. The achievement of a net balance of forces on opposite sides of the film strip as it passes the doctoring surface in accordance with the disclosure of the aforementioned issued U.S. patents has contributed substantially to the solution of this problem by permitting the film strip carried particles to pass the doctoring surfaces without accumulation and without dragging or streaking the processing fluid in a manner to create blemishes which will appear in the viewed images of the processed film. There remains, however, a potential for accumulation or wedging of foreign particles as a result of the inclination of the doctoring surface toward its trailing end which provides a narrowing gap between the doctor blade and the film surface. A large portion of the particles present on the film strip which may accumulate and affect deposition of the processing fluid are what are referred to as "stringers" or shavings of film strip which are a product of steps carried out in the manufacture of the film strip. Such shavings of film are potentially on the order of 0.002 inch wide and up to 0.010 to 0.015 inch in length. Because of the potential of such stringers entering into the narrowing gap between the doctor blade and the film, and the resultant high probability of a degrading of the function of the doctor blade due to the size of such particles, it is deemed particularly desirable to prevent such debris from passing into the region of the doctor blade.

SUMMARY OF THE INVENTION

In accordance with the present invention, the potential for problems associated with the presence of stringer-type debris on the film strip during deposition of processing fluid from a cassette-contained processor is minimized by the provision of a processing fluid applicator nozzle structure in which a doctoring surface conformation determining the thickness of processing fluid coating on the film strip is configured to produce the desired hydrodynamic force in the fluid and includes at least one inclined surface extending from the vicinity of the trailing edge of the fluid applicator nozzle in close proximity to the emulsion surface of the film strip and diverging in the direction of film strip movement away from the surface of the film.

In a preferred embodiment, the doctoring surface conformation is defined by a plurality of first inclined surfaces extending from the vicinity of the trailing edge of the nozzle and converging in the direction of film strip movement towards the surface of the film. A plurality of second inclined surfaces extending also from the vicinity of the trailing edge of the nozzle opening in close proximity to the film surface and diverging in the direction of film strip movement away from the film surface are provided in alternating side-by-side relation with the first plurality of inclined surfaces. The arrangement of the two series of inclined surfaces cooperate to present a "comb-like" arrangement at the leading end of the doctoring surface as viewed from upstream of the doctoring surface in the direction of film strip movement. The widths of the first and second pluralities of inclined surfaces and the slopes are selected so as to produce a positive hydrodynamic force in processing fluid passing under the doctoring surface.

As in prior devices, the film strip may be retained upwardly against the underside of the nozzle by a yieldable force balancing the hydrodynamic force developed in the fluid by the nozzle. The doctoring surfaces are spaced from the upper emulsion surface of the film strip by a pair of depending planar guide tracks which are disposed on opposite sides of the doctoring surface and configured to engage the nonemulsion bearing portions of the film strip adjacent the film margins. As a result of this construction, "stringer-type" foreign particles are discouraged from entering into the region between the doctor blade and the film strip where the uniform coating of processing fluid is established by the "comb-like" structure presented by the leading end of the doctoring surface. Elongated "stringer-type" particles accordingly are caused to remain in a circulation of processing fluid which is present upstream of the entrance to the doctoring region and in no way affect the uniformity of coating application across the full width of the emulsion in which the image bearing frames are formed.

Among the objects of the invention are, therefore: the provision of an improved apparatus for the application of processing fluid to the emulsion side of the photographic film strip; the provision of an improved processor for film strips contained in multipurpose film cassettes; the provision of such a processor having an improved doctoring nozzle structure for minimizing the effect of or eliminating the accumulation of elongated foreign particles on critical surfaces during the application of processing fluid onto the film strip; and the provision of such a nozzle structure capable of manufacture at costs which are practical for a once-used component in a mass produced film cassette.

Other objects and further scope of applicability of the present invention will become apparent from the detailed description to follow taken in conjunction with the accompanying drawings in which like parts are designated by like reference numerals.

BRIEF DESCRIPTION OF THE DRAWINGS

FIG. 4 is an end view taken along the line 4—4 of FIG. 3;

FIG. 5 is a vastly enlarged fragmentary cross section of the nozzle arrangement of FIG. 3;

FIG. 6 is an end view as taken along the line 6—6 of FIG. 5; and

FIG. 7 is a greatly enlarged fragmentary plan view of the trailing edge of the doctoring surface of the processor shown in FIG. 2.

DETAILED DESCRIPTION OF THE PREFERRED EMBODIMENT

Figure 1:
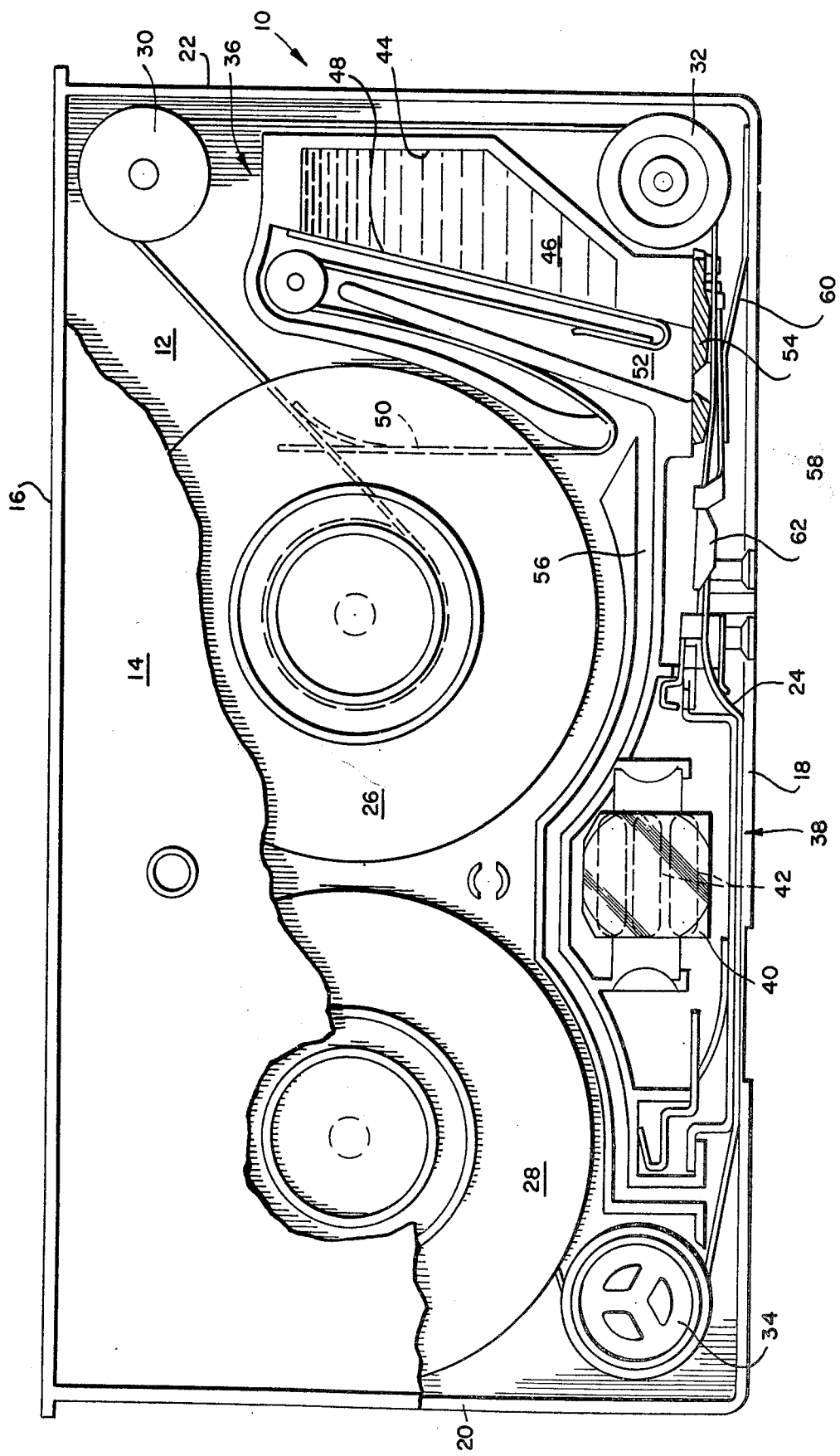
FIG. 1 is a side elevation in partial cross section illustrating the interior arrangement of a cassette incorporating the present invention.

In FIG. 1 of the drawings, a multi-purpose film cassette incorporating the present invention is shown to include a housing generally designated by the reference numeral 10 and taking the form of a rectangular parallelepiped having a pair of exterior side walls 12 and 14 connected by top, bottom and end walls 16, 18, 20 and 22, respectively. Within the housing 10, a film strip 24 is connected at opposite ends to supply and take-up spools 26 and 28 for movement through a series of linear flights or runs defined by a bobulator roller 30, an idler guide roller 32 and a snubbing roller 34. The run of the film strip 24 between the guide roller 32 and the snubbing roller 34, in passing from the supply spool 26 to the take-up spool 28 traverses a processor, designated generally by the reference numeral 36, and an exposure/projection aperture 38 in the bottom housing wall 18 under a reflecting prism 40 located adjacent ventilating openings 42 in the side wall 12.

The processor 36 includes a reservoir or pod 44 of processing fluid 46 initially sealed by a tear strip 48 which is connected to a film strip engaging pull strip 50. The construction and operation of the pull strip 50 is fully disclosed in U.S. Pat. No. 3,895,862 issued July 22, 1975 to Joseph A. Stella et al. and need not be further described here except to note that upon initiation of a processing cycle, the pull strip becomes engaged by an aperture (not shown) in the trailing end portion of the film strip 24 to pull the tear strip 48 away from the pod or reservoir 44 and allow the processing fluid 46 to flow into a chamber 52 closed at its bottom by an applicator nozzle 54 to be described in more detail below. At the completion of tear strip removal, the pull strip 50 becomes wound between the convolutions of the film strip wrapped on the supply spool 26 whereas the tear strip 48 becomes separated to remain in a storage chamber 56.

Also in accordance with the disclosures of prior patents including those mentioned above, the run of the film strip 24 between the rollers 32 and 34 is situated between the bottom of the nozzle 54 and a pressure pad 58 biased upwardly by a spring 60 supported in the bottom wall 18 of the housing 10. A valve member 62 is positioned upstream of the nozzle 54 in the context of film strip travel during exposure and projection (downstream in the context of film strip rewind movement during processing) and is engageable by a necked-down portion (not shown) in the leading end portion of the film strip 24 to be advanced from the position shown to a position underlying the nozzle 54 at the end of a processing operation.

The general organization of cassette components illustrated in FIG. 1 as well as the operation of such components during exposure, processing and projection of the film strip 24, without removal thereof from the housing 10, is summarized herein principally for the purpose of providing an understanding of the environment in which the improved structure of the nozzle 54 is used. For example, it will be noted that although the housing 10 constitutes an essentially light-tight enclosure for the film strip 24, openings such as the vent openings 42 and the exposure/projection opening 38, which are important to overall system operation, prevent exclusion of foreign particles such as dust to the housing interior. In addition to dust particles and other particles entering through the openings described above, many of the particles found to be carried by the film strip as used in the cassette which the present invention is used, have been found to be elongated shavings of film which result from steps of splitting the film strip, perforating it, and other operations carried out on the film strip during the manufacture thereof. Such unwanted debris is referred to as "stringer type" particles and typically could be only 0.002 inch wide and in the neighborhood of 0.010 to 0.015 inch in length.

While the effect of foreign particles on the film strip 24 or otherwise within the cassette interior, during use of the cassette to expose the film strip 24 or to project the transparent image frames formed thereon after processing, is not significantly different than it is on conventional exposure or projection of motion picture film strips, it is important to completely satisfactory operation of the processor 36 that such foreign particles not interfere with the achievement of a uniform layer of the processing fluid 46 on the exposed emulsion layer of the film strip. The passage of stringer-type particles into the region of the doctor blade which deposits the processing fluid upon the emulsion bearing surface of the film strip, because of their potentially large length, is deemed particularly undesirable and it is to the prevention of such an occurrance to which the improved nozzle structure to be now described is directed.

Figure 2:
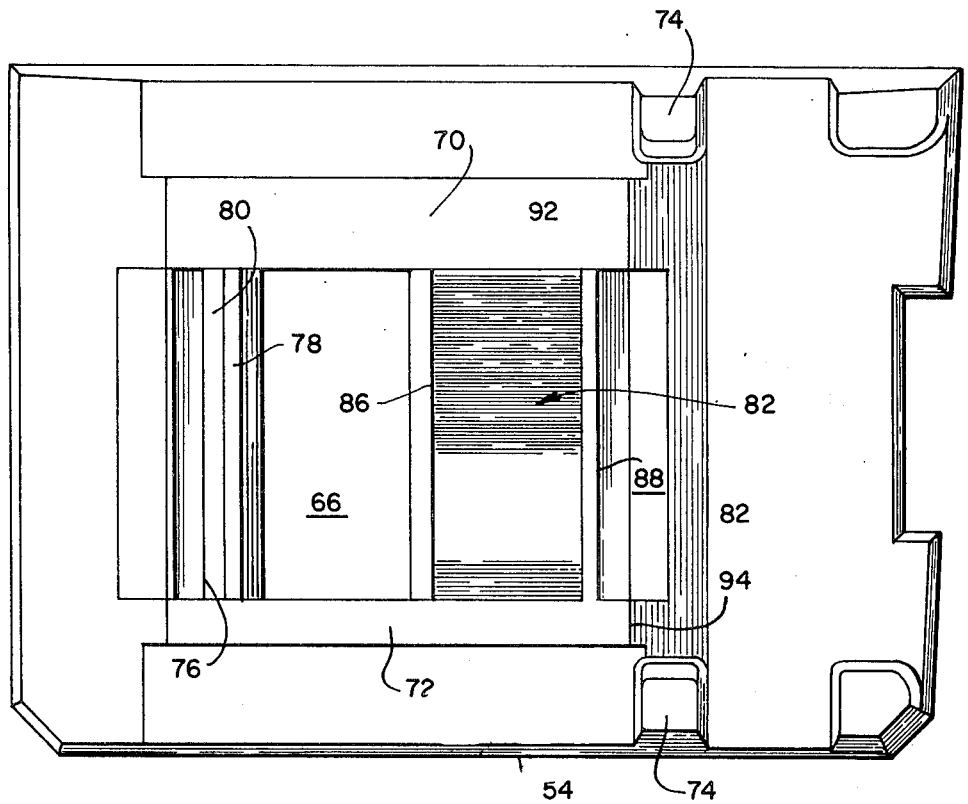
FIG. 2 is an enlarged bottom plan view of a processor nozzle incorporating the present invention.
Figure 3:
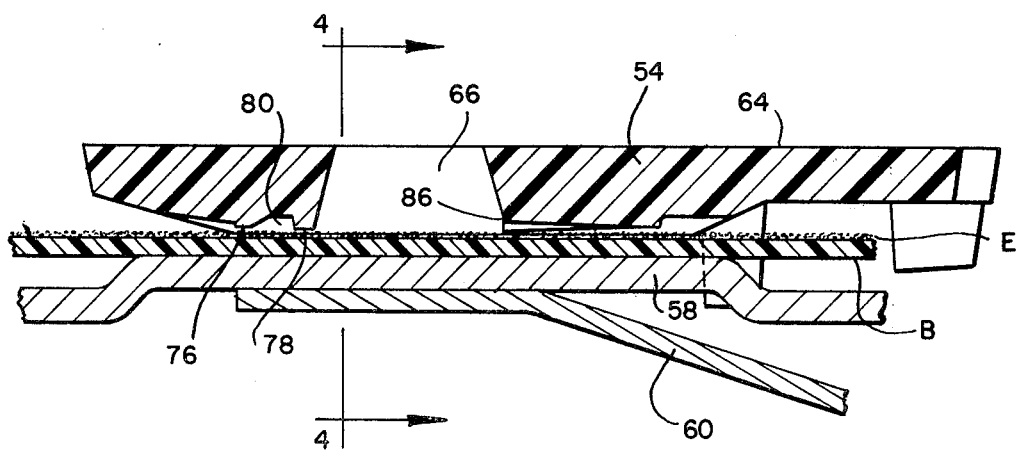
FIG. 3 is a greatly enlarged sectional view of a nozzle portion of the processor of the invention.

An understanding of the improved nozzle structure of the present invention and its use in operation may be gained by reference to FIGS. 2–7 of the drawings in which a preferred embodiment is illustrated. The nozzle 54 is an integral molding of suitable synthetic resinous material having an essentially planar top surface 64 adapted to be secured in a suitable manner such as by ultrasonic welding, thermal fusion or adhesives to the bottom of the processor 36 in the general relationship described above with respect to FIG. 1. A generally rectangular nozzle opening 66 opens through the upper surface 64 and extends to the opposite side or bottom of the nozzle against which the film strip 24 is retained by the pressure pad 58 during processing. In FIGS. 3, 4 and 5, the film strip 24 is illustrated in greater detail to include an emulsion layer E and a carrier base B. While as shown in FIG. 4, the emulsion layer E extends completely across the width of the carrier base B throughout framing margins 65 and 67, the useable image width 69 is confined to the lateral separation therebetween. Additionally, one margin 65 is of greater width than the other so as to include perforations or feed apertures 68 for engagement by an incremetnal feed mechanism or shuttle (not shown) during exposure and projection.

In FIG. 2, the surface configuration of the underside of the nozzle 54 presented to the film strip 24 is shown to include elongated planar guide tracks 70 and 72 located on the opposite sides or lateral edges of the nozzle opening 66 in overlying relation to the film margins 65 and 67, the track 70 being somewhat wider than the track 72 because of the wider margin required on one side of the film strip to accommodate the feed perforations 68. A pair of post-like abutments 74 depend from the undersurface of the nozzle and function to laterally guide the film past the nozzle and as stops for the valve member 62.

As described and claimed in the commonly assigned, copending application Ser. No. 791,136 of Joseph A. Stella, filed Apr. 26, 1977, entitled "Film Cassette Contained Processing Fluid Applicator Having Particle Trapping Arrangement", configuration of the nozzle 54 to the left of the opening 66 in FIGS. 3 and 5, or upstream from the nozzle opening in terms of film strip travel during processing, is provided with a pair of transverse linear projections or scraper blade formations 76 and 78 spaced longitudinally by a transverse recess 80. The scraper blade formations 76 and 78 terminate downwardly in planar bottom surfaces elevated slightly from the surface of the tracks 70 and 72 by a distance preferably on the order of 0.0001 inch but may approach zero or to a point where the bottom surfaces of the scraper blade formations 76 and 78 are truly flush with the surface of the guide tracks 70 and 72. Such an arrangement serves to prevent passage of a large proportion of the dirt and debris carried by the film strip into the nozzle/doctor blade region.

The overall configuration of the fluid doctoring surface 82 is shown most clearly in FIGS. 2, 5 and 6 of the drawings to include a first series of inclined surfaces 84, each of which originates at the rear edge surface 86 of the nozzle opening 66 at a distance above the emulsion bearing surface E of the film strip identified by the letter "D". Each surface 84 extends to the right as viewed in FIG. 5, or in the direction of film strip travel, and converges downwardly towards the emulsion surface E of the film strip where it terminates at the trailing edge 88 of the doctoring conformation at a distance "d" from the emulsion surface. The doctoring conformation 82 is further defined by a second series of inclined surfaces 90 alternately disposed across the width of the doctoring conformation 82 with surfaces of the first series 84. The second inclined surfaces 90 also originate at the rear edge surface 86 of the nozzle openings 66. Each of the second surfaces 90 is spaced at its leading end, above the emulsion surface E, by a distance C which is in very close proximity to the emulsion surface, further each of the surfaces 90 is configured to extend from its origin near the rear edge 88 of the nozzle to the right or in the direction of film strip travel in a manner diverging away from the emulsion bearing surface E of the film strip.

As can be seen in FIGS. 2, 5 and 7, each of the surfaces 90 diverging away from the emulsion bearing surface is of such a slope that it intersects with an imaginary plane defined by the first series 84 of converging surfaces at a location upstream of the trailing edge 88 of the doctoring conformation 82. From the point, or line, of intersection identified by the reference number 92 in FIGS. 5 and 7, the slope of each of the diverging surfaces 90 changes to conform with the slope of the converging surfaces 84 resulting in a uniform slope inclined surface 94 extending from the point of intersection 92 and converging towards the emulsion bearing surface E of the film strip terminating at the trailing end 88 of the doctoring conformation 82.

As can be seen in FIGS. 4 and 6, the marginal edges of the doctoring surface 82 are defined by vertical wall surfaces 96 and 98 which extend, as best seen in FIG. 6, from one of the diverging surfaces 90 to the guide tracks 70 and 72 respectively. As is again best seen in FIG. 6, the surfaces of the guide tracks 70 and 72 (only 72 being shown) define the plane in which the upwardly facing surface of the emulsion surface E is held when passing underneath the doctoring conformation 82. Accordingly, the dimensions D and C earlier defined with respect to the emulsion bearing surface E may also be defined with respect to a plane passing common with the surface of the guide tracks 70 and 72. Similarly, the dimension d defining the height of the converging doctoring surface 94 extending the full width of the doctoring conformation at the trailing end 88 thereof may also be defined with respect to the plane passing through the guide tracks 70 and 72.

The alternating array of parallel converging and diverging surfaces 84, 90, respectively, accordingly defines a plurality of parallel entrance channels extending from the rear edge 86 of the nozzle opening 66 and having a decreasing depth as they extend in the direction of film strip movement during processing. The width of the converging and diverging surfaces and the respective slopes of the two groups of surfaces are selected so that the total cross sectional area defined between the doctoring surface conformation 82 and the emulsion bearing surface E of the film strip has a gradually decreasing cross sectional area as the doctoring conformation progresses from the leading to the trailing edge of the doctoring surface 82. This diminishing cross sectional area between the doctoring conformation and the film strip creates, in the processing fluid 46 passing thereunder, a hydrodynamic force against the film strip portion being advanced thereunder.

It should be appreciated that the hydrodynamic force developed by the doctoring conformation 82 will be effected by not only the dimensions of the various clearances between the doctoring surface and the emulsion bearing surfaces of the film strip, but also by the velocity of the film strip passing thereunder and the characteristics of the processing fluid being deposited thereon. Above-cited U.S. Pat. No. 3,951,530 describes in detail a processing fluid which exhibits non-Newtonian fluid viscosity characteristics which is of particular use in a fluid application system wherein the film speed velocities may vary; in the preferred embodiment, for example, from 30 to 90 inches per second. The disclosure of U.S. Pat. No. 3,951,530, accordingly, is hereby incorporated by reference.

Exemplary dimensions for the above-described doctoring blade conformation which have been found satisfactory in practice with film speed velocities varying from 30 to 90 inches per second and where the processing fluid exhibits the non-Newtonian fluid viscosity characteristics described in the above-referenced patent, include a length of doctoring surface represented by the dimension L in FIG. 5 of approximately 0.115 inch; a doctoring surface leading edge height for the converging surfaces 84 (the dimension D) of approximately 0.0040 inch; a doctoring surface leading edge height of the diverging surfaces 90 (the dimension C) of approximately 0.0001 inch and a doctoring conformation trailing edge height (the dimension $d$) of approximately 0.000650 inch. The width of each of the converging surfaces 84 is 0.003 inch and the width of each of the diverging surfaces is 0.002 inch. Accordingly, in this preferred embodiment, each of the entrance openings at the leading end of the doctoring conformation 82 has a maximum dimension, measnured in any direction thereacross, which is less than the width across the single exit opening.

The dimensions set forth above provide a processing fluid coating on the emulsion surface E of approximately 0.0005 inch in thickness. The transverse width of the useable emulsion E, the nozzle opening 66 and of the doctoring surface conformation 82 are approximately 0.225 inch for the film strip used.

Accordingly, it will be seen that any particles of the "stringer" type having exemplary dimensions on the order of 0.002 inch by 0.015 inch will be prohibited from passing into the region under the doctoring surface conformation 82 by virtue of the plurality of fluid entrance channels which are in effect defined by the doctoring surface conformation described above. In practice, it has been found that particles of this size which are able to pass into the nozzle region, i.e., past the scraper blade formations 76 and 78, will tend to remain in circulation within a mildly turbulent area which is present just upstream of the trailing edge 86 of the nozzle opening and accordingly will not pass into the doctoring region where their accumulation to an extent where streaking or other interference with the achievement of a uniform layer of processing fluid could occur.

Thus, it will be appreciated that as a result of this invention, an improved nozzle structure is provided for photographic film strip processors and by which the above-mentioned objectives are completely fulfilled. Also, it will be apparent to those skilled in the art that modifications and/or changes may be made in the illustrated embodiment without departure from inventive concepts manifested thereby. Accordingly, it is expressly intended that the foregoing description is of a preferred embodiment only, not limiting, and that the true spirit and scope of the present invention be determined by reference to the appended claims.

What is claimed is:

1. Fluid coating apparatus comprising:
   means for supporting one side of an incremental section of an elongated strip of material;
   actuatable means for progressively advancing incremental sections of the elongated strip of material across said support means in a given direction;
   means for depositing a substantially uniform coating of a fluid to the other side of the elongated strip of material as it is progressively advanced across said support means while tending to preclude foreign matter from adversely affecting the uniformity of the fluid coating, said fluid depositing means including a processor adapted to cooperate with said support means to slidably engage an incremental section of the elongated strip of material therebetween, said processor configured to define a nozzle opening through which the fluid may be initially introduced into engagement with the elongated strip of material and a doctoring conformation communicating with said nozzle opening and extending away therefrom in said given direction, said doctoring conformation being configured to produce hydrodynamic forces in the fluid passing thereunder which increase in said given direction and further configured to present at least one surface, adjacent the fluid applied to the elongated strip of material, extending away from said nozzle opening in said given direction in a manner diverging away from the elongated strip of material.

2. The apparatus of claim 1 wherein said doctoring conformation is further configured to present at least one surface, adjacent the fluid applied to the elongated strip of material, extending away from said nozzle opening in said given direction in a manner converging towards the elongated strip of material.

3. The apparatus of claim 2 wherein said at least one surface extending in a manner diverging away from the elongated strip of material intersects the plane of said at least one surface extending in a manner converging towards the elongated strip of material before the end of said converging surface and from the line of intersection converges with said converging surface to form a single surface, the full width of said doctoring conformation, converging towards said elongated strip of material.

4. The apparatus of claim 2 wherein said doctoring conformation presents an alternating array of said diverging and converging surfaces.

5. Fluid coating apparatus comprising:
   means for supporting one side of an incremental section of an elongated strip of material;
   actuatable means for progressively advancing incremental sections of the elongated strip of material across said support means in a given direction;
   means for depositing a substantially uniform coating of a fluid to the other side of the elongated strip of material as it is progressively advanced across said support means while tending to preclude foreign matter from adversely affecting the uniformity of the fluid coating, said fluid depositing means including a processor adapted to cooperate with said support means to slidably engage an incremental section of the elongated strip of material therebetween, said processor configured to define a nozzle opening through which the fluid may be initially introduced into engagement with the elongated strip of material and a doctoring conformation communicating with said nozzle opening and extending away therefrom in said given direction, said doctoring conformation being configured to produce hydrodynamic forces in the fluid passing thereunder which increase in said given direction and further configured to define a fluid entrance opening surface extending across the portion of the width of the elongated strip of material to be coated with the fluid which presents a plurality of projections extending a distance closer to the elongated strip of material than the other portions of said fluid entrance opening surface and to define a fluid exit opening surface extending across the portion of the width of the elongated strip of material to be coated with the fluid which is substantially entirely uniformly spaced from the elongated strip of material.

6. Fluid coating apparatus comprising:
means for supporting one side of an incremental section of an elongated strip of material;
actuatable means for progressively advancing incremental sections of the elongated strip of material across said support means in a given direction;
means for depositing a substantially uniform coating of a fluid to the other side of the elongated strip of material as it is progressively advanced across said support means while tending to preclude foreign matter from adversely affecting the uniformity of the fluid coating, said fluid depositing means including a processor adapted to cooperate with said support means to slidably engage an incremental section of the elongated strip of material therebetween, said processor configured to define a nozzle opening through which the fluid may be initially introduced into engagement with the elongated strip of material and a doctoring conformation communicating with said nozzle opening and extending away therefrom in said given direction, said doctoring conformation being configured to produce hydrodynamic forces in the fluid passing thereunder which increase in said given direction and further configured to present a plurality of entrance channels and a single exit channel, each of said entrance channels having a maximum dimension in any direction thereacross which is less than the width across said exit channel.

7. A photographic film handling cassette for use with other apparatus, for treating a strip of exposed photographic film material, having a light sensitive emulsion on one surface thereof, with processing fluid to develop viewable images on the film strip, said cassette comprising:
a housing for retaining the film strip;
means for supporting incremental sections of the other surface of the film strip;
means responsive to drive means of the other apparatus for advancing the film in a given path within said housing traversing said support means in a given direction;
means for depositing a substantially uniform coating of processing fluid to the emulsion bearing surface of the photographic film strip as it is progressively advanced across said support means while tending to preclude foreign matter from adversely effecting the uniformity of the fluid coating, said fluid depositing means including a processor adapted to cooperate with said support means to slidably engage an incremental section of the film strip therebetween, said processor configured to define a nozzle opening through which the fluid may be initially introduced into engagement with the film strip and a doctoring conformation communicating with said nozzle opening and extending away therefrom in said given direction, said doctoring conformation being configured to produce hydrodynamic forces in the fluid passing thereunder which increase in said given direction and further configured to present at least one surface adjacent the fluid applied to the film strip, extending away from said nozzle opening in said given direction in a manner diverging away from the emulsion bearing surface of said film strip.

8. The apparatus of claim 7 wherein said doctoring conformation is further configured to present at least one surface, adjacent the fluid applied to the film strip, extending away from said nozzle opening in said given direction in a manner converting toward the emulsion bearing surface of the film strip.

9. The apparatus of claim 8 wherein said at least one surface extending in a manner diverging away from the film strip intersects the plane of said at least one surface extending in a manner converging towards the film strip before the end of said converging surface and from the line of intersection converges with said converging surface to form a single surface the full width of said doctoring coformation converging towards the film strip.

10. The apparatus of claim 8 wherein said doctoring conformation presents an alternating array of said diverging and converging surfaces.

11. A nozzle for use with a fluid applicator for depositing a substantially uniform coating of a fluid to one side of an elongated strip of material as the material is progressively advanced thereby in a given direction with the elongated strip of material supported in confronting relation with the nozzle, said nozzle being configured to define a nozzle opening through which the fluid may be initially introduced into engagement with the elongated strip of material and a doctoring conformation communicating with said nozzle opening and extending away therefrom in the given direction, said doctoring conformation being configured to produce hydrodynamic forces in the fluid passing thereunder which increase in the given direction, and further configured to present at least one surface, adjacent the fluid applied to the elongated strip of material, extending away from said nozzle opening in said given direction in a manner diverging away from the elongated strip of material.

12. The apparatus of claim 11 wherein said doctoring conformation is further configured to present at least one surface, adjacent the fluid applied to the elongated strip of material, extending away from said nozzle opening in the given direction in a manner converging towards the elongated strip of material.

13. The apparatus of claim 12 wherein said at least one surface extending in a manner diverging away from the elongated strip of material intersects said at least one surface extending in a manner converging towards the elongated strip of material before the end of said converging surface and from the line of intersection converges with said converging surface to form a single surface the full width of said doctoring conformation converging towards said elongated strip of material.

14. The apparatus of claim 12 wherein said doctoring conformation presents an alternating array of said diverging and converging surfaces.

15. A photographic film handling cassette for use with other apparatus, for treating a strip of exposed photographic film material, having a light sensitive emulsion on one surface thereof, with processing fluid to develop viewable images on the film strip, said cassette comprising:

a housing for retaining the film strip;

means responsive to drive means of said other apparatus for advancing the film in a given direction within said housing;

film processing means for depositing a layer of processing fluid on the emulsion surface of the exposed film strip, said processing means including a nozzle member having a nozzle opening configured for releasing processing fluid to the film strip as it is advanced thereby, said nozzle member further including means defining a fluid doctoring conformation on said nozzle member downstream from said nozzle opening relative to said given direction of film strip movement, said doctoring conformation including; a plurality of first inclined surfaces extending from the vicinity of the trailing edge of said nozzle opening, in said given direction, and converging towards the emulsion surface of said film, and a plurality of second inclined surfaces extending from the vicinity of the trailing edge of said nozzle opening in close proximity to the emulsion surface of the film strip and diverging, in said given direction, away from said emulsion surface, at least one of said first inclined surfaces being disposed in side-by-side relation with each of said second inclined surfaces and, the width of said first and second inclined surfaces and the slopes thereof being selected so as to produce a positive hydrodynamic force in the fluid passing under said doctoring conformation.

16. The apparatus of claim 15 wherein each of said first inclined surfaces has the same first slope and wherein each of said second inclined surfaces has the same second slope.

17. The apparatus of claim 16 wherein said first and second pluralities of inclined surfaces are parallel to one another and cooperate to define a plurality of parallel grooves of decreasing depth extending parallel to and in the direction of film strip movement.

18. The apparatus of claim 16 wherein said second slope of said second inclined surfaces is such that said second surfaces intersect with said first surfaces before the trailing end of said surface conformation, said second slope of said second surfaces changing to said first slope at said intersection, so that said doctoring conformation comprises a uniform inclined surface, having said first slope, extending from the point of intersection of said first and second surfaces and converging towards the emulsion surface of said film and terminating at the trailing end of said surface conformation.

19. The apparatus of claim 17 wherein said first and second inclined surfaces are parallel to one another and cooperate to define a plurality of parallel grooves of decreasing depth extending parallel to and in the direction of film strip movement, said second slope of said second inclined surfaces being such that said second surfaces intersect with said first surfaces before the trailing end of said surface conformation, said second slope of said second surfaces changing to said first slope at said intersection, so that said doctoring conformation comprises a uniform inclined surface, having said first slope, extending from the point of intersection of said first and second surfaces and converging towards the emulsion surface of said film and terminating at the trailing end of said surface conformation.

20. The apparatus of claim 15 wherein said nozzle member includes a pair of downwardly facing planar guide tracks laterally spaced from one another on opposite sides of said fluid doctoring conformation to support the moving run of the film strip in a plane common with the surface of said guide tracks and wherein each of said second inclined surfaces is elevated above said planar guide tracks by a distance on the order of 0.0001 inch at its leading end adjacent said nozzle opening.

21. The apparatus of claim 20 wherein each of said plurality of first inclined surfaces is elevated above the level of the planar guide tracks at its leading end adjacent said nozzle opening by a distance on the order of 0.004 inch.

22. The apparatus of claim 20 wherein each of said first and second inclined surfaces defining said doctoring conformation is elevated above the level of the planar guide tracks by a distance on the order of 0.0007 inch at its trailing end.

* * * * *